(12) United States Patent
Oehninger

(10) Patent No.: US 7,484,454 B2
(45) Date of Patent: Feb. 3, 2009

(54) OUTFLOW DISTRIBUTOR FOR ESPRESSO COFFEE MAKER

(75) Inventor: Max Oehninger, Stäfa (CH)

(73) Assignee: Eugster/Frismag AG, Romanshorn (CH)

(*) Notice: Subject to any disclaimer, the term of this patent is extended or adjusted under 35 U.S.C. 154(b) by 0 days.

(21) Appl. No.: 11/487,237

(22) Filed: Jul. 14, 2006

(65) Prior Publication Data
US 2007/0012193 A1 Jan. 18, 2007

(30) Foreign Application Priority Data
Jul. 16, 2005 (DE) .................. 20 2005 011 203 U

(51) Int. Cl.
*A47J 31/00* (2006.01)

(52) U.S. Cl. .................. 99/287; 99/289 R; 99/291; 99/293; 99/295; 99/323

(58) Field of Classification Search .................. 99/275, 99/279–323, 452–455; 426/433
See application file for complete search history.

(56) References Cited

U.S. PATENT DOCUMENTS

| | | | | |
|---|---|---|---|---|
| 5,150,645 A | * | 9/1992 | Schiettecatte | 99/295 |
| 5,473,973 A | * | 12/1995 | Cortese | 99/295 |
| 5,634,394 A | * | 6/1997 | Cortese | 99/295 |
| 6,012,379 A | * | 1/2000 | Matuschek | 99/323 |

FOREIGN PATENT DOCUMENTS

| | | |
|---|---|---|
| DE | 70 03 310 | 10/1970 |
| DE | 77 00 199 | 9/1977 |
| DE | 31 24 642 | 4/1982 |
| DE | 89 00 362 | 6/1990 |
| DE | 40 37 366 | 5/1992 |
| DE | 202 06 545 | 9/2002 |
| DE | 698 04 146 | 3/2003 |
| DE | 203 20 569 | 1/2005 |
| DE | 10 2004 004 820 | 8/2005 |
| EP | 1 317 200 | 6/2003 |
| WO | WO 02/19877 | 3/2002 |
| WO | WO 03/105644 | 12/2003 |
| WO | WO 2004/060121 | 7/2004 |

* cited by examiner

*Primary Examiner*—Timothy F. Simone
(74) *Attorney, Agent, or Firm*—William L. Androlia; H. Henry Koda

(57) ABSTRACT

Based on an outflow distributor for espresso coffee makers comprising one common coffee inlet (2) and at least two partial outflow openings (19, 20) connected to it in a flow conducting manner, and flow dampening means disposed upstream of the partial outflow openings, brewed coffee is to be equally distributed over two cups while avoiding considerably differently-sized air bubbles. To this end, two partial outflow ducts (3, 4) branched off from the common coffee inlet (2) include an open end section (5, 6) each, which is directed in a baffle chamber (11, 12) each against a baffle wall (9, 10). One of the baffle chambers (11, 12) each is formed in one outflow body (7, 8) each which includes, in spaced relationship below said baffle wall (9, 10), one of the partial outflow openings (19, 20).

6 Claims, 1 Drawing Sheet

OUTFLOW DISTRIBUTOR FOR ESPRESSO COFFEE MAKER

BACKGROUND OF THE INVENTION

1. Field of the Invention

The present invention relates to an outflow distributor for espresso coffee makers.

2. Description of the Related Art

Prior art espresso coffee makers are in most cases equipped with outflow distributors which evenly distribute the coffee, or the espresso, respectively, brewed in the coffee maker having a brewing unit into two cups. The even distribution aimed at, however, may be disturbed for instance by large air bubbles of considerably differing sizes output from a brew chamber of the brew unit and contained in the crema of the espresso.

It has already been known to design an espresso coffee maker filter carrier so that the crema flowing from two outflow holes is not interrupted by larger bubbles and one or the other outflow hole is blocked with the result that the two cups under the filter carrier would be unevenly filled (DE-G 29502595.6). In this connection, it has been known in detail to provide the espresso coffee maker filter carrier with a sieve insert, under which a collector space for brewed espresso is disposed and in the bottom of which the outflow holes are formed, with a cap-shaped cover in the collector space above the outflow holes, wherein a peripheral region of the cap-shaped cover is provided with a plurality of passage openings.

This solution requires, therefore, a voluminous filter carrier which is not, in this form, available in espresso coffee makers designed for brewing espresso using portioned capsules or pouches.

BRIEF SUMMARY OF THE INVENTION

It is the object of the present invention to provide an outflow distributor for espresso coffee makers which, in connection with a compact design, avoids the disturbing effect of differently sized air bubbles when the brewed espresso collected is fed to a common coffee inflow of such an outflow distributor.

This problem is solved by providing an outflow distributor according to the present invention.

In accordance with the invention, the flow damping means in the outflow distributor comprise a baffle wall in a baffle chamber against which one open end section each of one partial outflow duct each is directed which is branched off from the common coffee inflow. By the impact of the coffee flow, a partial flow from the partial outflow duct, against the baffle wall, a pressure surge caused by opening a crema valve in the brew unit is dampened, and larger air bubbles in the brewed coffee, or in the crema, respectively, will burst. The coffee flow so calmed down flows downward to the partial outflow opening in the respective outflow body in a more uniform consistency which provides for a uniform distribution of the partial coffee outflows from the partial outflow openings of the outflow distributor.

According to the second aspect of the present invention, the outflow bodies are preferably cylindrically shaped, at least in the interior, for which reason they may be termed as outflow cylinders, and are closed above by the associated baffle wall. One interior space portion of the outflow body at the baffle wall and at an adjacent cylindrical inner wall section can also be termed as a baffle chamber. The end sections of the partial outflow ducts are cylindrical, too, they are shaped having a smaller radius than the inner radius of the outflow body, so that, inside, between a mantle face of the baffle body and the end section of the partial outflow duct, a cylindrical outflow channel is formed. Since the end sections of the partial outflow ducts in the baffle chambers, or the outflow bodies, respectively, are upwardly directed against the respective baffle walls, the length of the cylindrical outflow channels towards the partial outflow openings in the outflow bodies will be large though the outflow bodies may have compact dimensions, and the smaller bubbles are embedded in the coffee, or crema, respectively, uniformly flowing down in a laminar manner.

In accordance with the third aspect of the present invention, one centering thorn each is advantageously provided in the outflow body at one of the upwardly directed end sections of the partial outflow ducts at the lower end. In this way, the cylindrical outflow channel is prolonged in the downward direction.

When each of the partial coffee flows is flowing downwardly through the prolonged cylindrical outflow channel in one of the outflow bodies, it is again calmed down before it exits from the partial outflow opening of the outflow body. By using the centering thorns, centered partial coffee outflows are obtained which can flow out as laminar flows from the partial outflow openings. The laminar outflow from the partial outflow openings is supported when, according to the fourth aspect of the present invention, a distributor cross each, as known per se, is provided.

In order to remove residual coffee from the upwardly directed end sections of the partial outflow ducts, they are suitably perforated, as in accordance with the fifth aspect of the present invention, by a central passage bore which passes through a lower wall of the end section and through the following centering thorn.

In accordance with the sixth aspect of the present invention, the partial outflow ducts are shaped, structurally simple, as tubular ducts, and the end sections of the partial outflow ducts constitute diverting nozzles which divert the horizontal flow of the coffee in the partial outflow tubes into a vertical upward flow.

In accordance with the seventh aspect of the present invention, the partial outflow ducts are branched off from a lower opening of a coffee inlet tube whereby the outflow distributor, in spite of the additional outflow bodies, has relatively little mass and is of low weight.

BRIEF DESCRIPTION OF THE SEVERAL VIEWS OF THE DRAWINGS

One embodiment of the present invention will be explained in more detail based on a drawing comprising three figures from which further advantageous features of the invention may be taken in detail. In the figures

DETAILED DESCRIPTION OF THE INVENTION

Figure 1:
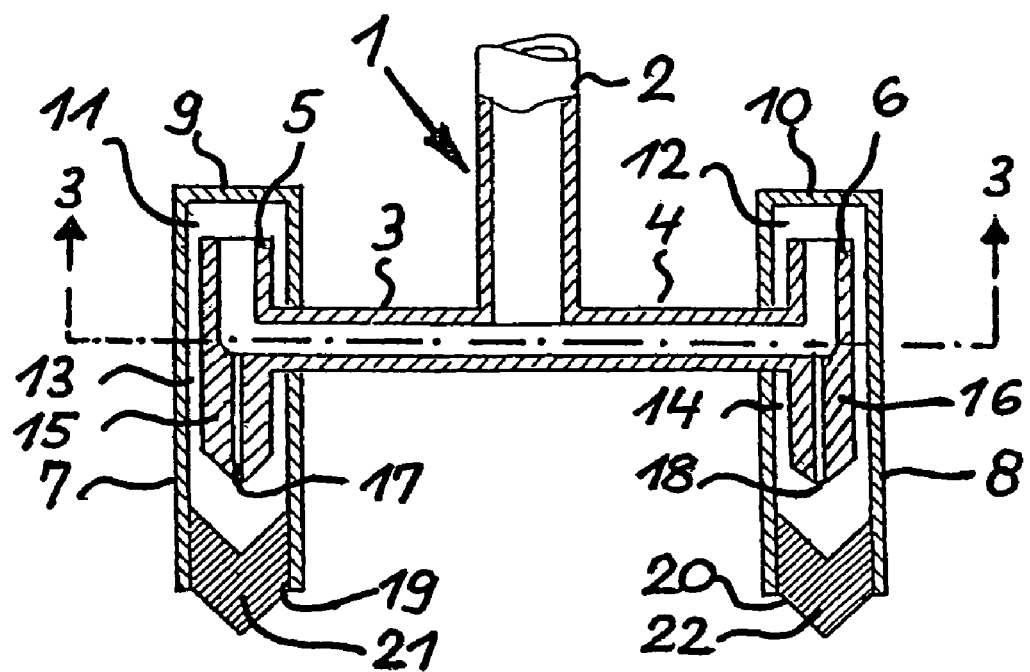
FIG. 1 is a cross section through the outflow distributor in a vertical sectional plan at an enlarged scale.
Figure 3:
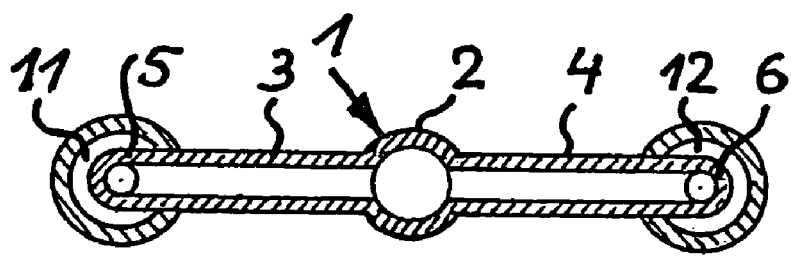
FIG. 3 is a view through sectional plan 3-3 of the outflow distributor according to FIG. 1.

In FIGS. 1 and 3, reference numeral 1 designates an outflow unit of an espresso coffee maker with which the espresso coffee maker may also be equipped at a later stage. It comprises a coffee inlet in the form of a coffee inflow tube 2 from which, at the lower end, two partial outflow tubes 3 and 4 are branched off as partial outflow ducts. End sections of the partial outflow ducts, or partial outflow tubes, respectively, are shaped as diverting nozzles 5 and 6 and are upwardly directed in outflow body 7 and 8 so that one non-designated opening each of diverting nozzle 5 or 6, respectively, is disposed in spaced relationship to a baffle wall 9 or 10, respectively, and is directed thereto. The outflow body 7, or 8, respectively, is closed by the baffle wall 9, or 10, respectively. In this way in the outflow body 7, or 8, respectively, which is shaped as an outflow cylinder, there is provided, by the baffle wall 9, or 10, respectively, and an adjacent cylindrical wall area of outflow cylinder 7, or 8, respectively, a baffle chamber 11, or 12, respectively, downwardly passing over into a cylindrical outflow channel 13, or 14, respectively. The outflow channel 13, or 14, respectively, is disposed between an inner wall of outflow cylinder 7, or 8, respectively, on one hand, and the diverting nozzle 5, or 6, respectively, arranged therein, and a centering thorn 15, or 16, respectively, attached at the lower end to diverting nozzle 5, or 6, respectively, on the other hand.

As can be taken in detail particularly from FIG. 1, a passage bore 17, or 18, respectively, is guided through a, not designated, wall of diverting nozzle 5 or 6, respectively, and the centering thorn 15 or 16, respectively, which virtually prolongs the diverting nozzle in downward direction so that residual coffee from coffee inflow tube 2, from partial outflow tubes 3, 4 and diverting nozzles 5, 6 can be drained downwardly through the passage bores 17, 18. The passage bores 17, 18 can also be considered as bypasses relative to the outflow channels 13, 14.

Figure 2:
FIG. 2 is a view from below on a detail of the outflow distributor, particularly on a partial outflow opening.

At the lower part of outflow bodies 7, 8, partial outflow openings 19, 20 are provided in which distribution crosses 21, or 22, respectively, are disposed. The design of one of the distributor crosses, for instance 22, can be taken from the view from below according to FIG. 2.

When operating an espresso coffee maker provided with the outflow distributor as described, the coffee flow, when opening the crema valve of the brewing chamber, flowing with a high speed from the brewing space into coffee inflow tube 2 is divided in the two partial outflow tubes 3, 4 into partial flows. Each partial flow exits via diverting nozzles 5, or 6, respectively, and impinges particularly on baffle wall 9 or 10, respectively, of baffle chamber 11 or 12, respectively. Thereby, the pressure surge caused by opening the crema valve is dampened and larger air bubbles will burst. Subsequently each of the now more even partial flows proceeds through one of cylindrical outflow channels 13, 14 in which it is further calmed down, and the smaller bubbles are embedded until it passes through distributor crosses 21 or 22, respectively, which together with the centering thorns 15 or 16, respectively, effect centered partial outflows, and it exits in practically laminar manner from the outflow unit 1. Hence, equally portioned partial flows leave the two partial outlet openings 19, 20. Also, the coffee which flows through passage bores 17, 18 and which, if there were no passage bores, would remain as coffee residue in tubes 2 through 4 and in diverting nozzles 5, 6 until a further brewing process or in-between cleaning process is initiated, is drained through these partial outlet openings 19, 20.

The invention claimed is:

1. An outflow distributor for espresso coffee makers comprising one common coffee inlet (2) leading to at least two partial outflow openings (19, 20), and flow dampening means disposed upstream of said partial outflow openings, and wherein:

two partial outflow ducts (3, 4) are branched-off from said common coffee inlet (2), said partial outflow ducts (3, 4) include one open end section (5, 6) each which is directed against a baffle wall (9, 10) each in one baffle chamber (11, 12) each, at least one baffle chamber (11, 12) is formed in one outflow body (7, 8) each which includes in spaced relationships below said baffle wall (9, 10) one of said partial outflow openings (19,20), outflow bodies (7, 8) are cylindrical, at least at the inside, and are closed above by one of said baffle walls (9, 10) each, at least said end sections (5, 6) of said partial outflow ducts (3, 4) are cylindrical, said end sections (5, 6) of said outflow ducts (3, 4) are directed upwardly in one of said outflow bodies (7, 8) each, and said end sections (5, 6) of said outflow ducts (3, 4) provided coaxially within said outflow bodies (7, 8) such that between an inner mantle face of either outflow body (7, 8) and said end section (5, 6) of an associated one of said partial outflow ducts (3, 4) a cylindrical outflow channel (13, 14) is formed which is open above towards the baffle wall (9, 10) and is open below towards said partial outlet opening (19, 20) of said outlet body (7, 8).

2. The outflow distributor according to claim 1, characterized in that in said outflow body (7, 8) one centering thorn (15, 16) each is linked to one of said upwardly directed end sections (5, 6) of said partial outflow ducts (3, 4).

3. The outflow distributor according to claim 1, characterized in that in said partial outflow openings (19, 20) one distributor cross (21, 22) each is disposed.

4. The outflow distributor according to either claim 2 or claim 3, characterized in that a central passage bore (17, 18) passes through a lower wall of said end section (5, 6) and through said centering thorn (15, 16) linked to it.

5. The outflow distributor according to one of claims 2 through 3 and 1, characterized in that said partial outflow ducts (3, 4) constitute tubular ducts and that said end sections of said partial outflow ducts (3, 4) are shaped as diverting nozzles.

6. The outflow distributor according to one of claims 2 through 3 and 1, characterized in that said coffee inlet (2) is a coffee inflow tube and that from a lower opening of said coffee inflow tube said partial outflow ducts (3, 4) are branched off.

* * * * *